United States Patent [19]

van der Bruggen

[11] 4,351,215

[45] Sep. 28, 1982

[54] DEVICE FOR THE ACOUSTIC INDICATION OF THE BEATS OF A MUSICAL TIME

[76] Inventor: Hendrik D. van der Bruggen, Loggerstraat 34, 1503 KD Zaandam, Netherlands

[21] Appl. No.: 223,132

[22] Filed: Jan. 7, 1981

[30] Foreign Application Priority Data

Jan. 25, 1980 [NL] Netherlands ........................ 8000494

[51] Int. Cl.$^3$ ........................ G09B 15/02; G10H 1/40; G10H 1/46

[52] U.S. Cl. ........................ 84/1.03; 84/1.27; 84/478; 84/DIG. 12; 84/DIG. 23

[58] Field of Search ........................ 84/1.03, 1.27, 478, 84/484, DIG. 12, 477 R, DIG. 23

[56] References Cited

U.S. PATENT DOCUMENTS

| | | | |
|---|---|---|---|
| 4,090,355 | 5/1978 | Morohoshi | 84/484 |
| 4,213,372 | 7/1980 | Sasaki et al. | 84/484 X |
| 4,294,155 | 10/1981 | Turner | 84/1.03 X |

*Primary Examiner*—Stanley J. Witkowski

*Attorney, Agent, or Firm*—Kane, Dalsimer, Kane, Sullivan and Kurucz

[57] ABSTRACT

The invention relates to a device for the acoustic indication of the beats of a musical time in which the tempo at which the beats are reproduced is adjustable. According to the invention means are provided for varying the musical properties of the separate beats, e.g. the reproducing period, the volume and the pitch, said varying means being provided with N switch elements each having at least three switch settings, and a scanning element for the cyclic consecutive scanning of the N switch elements, wherein a tone is generated in a first channel during the scan period of each of the switch elements in the second switch setting of the switch element, while a tone is generated in a second channel in the third switch setting of the switch element and no tone is generated in the first switch setting of the switch element in either channel, both channels being common to the N switch elements.

11 Claims, 3 Drawing Figures

DEVICE FOR THE ACOUSTIC INDICATION OF THE BEATS OF A MUSICAL TIME

BACKGROUND OF THE INVENTION

The invention relates to a device for the acoustic indication of the beats of a musical time wherein the tempo at which the beats are reproduced is adjustable.

A known device of this kind is, for example, the metronome. Such a device is used, for example, for indicating the tempo in music teaching. A disadvantage of the known device is that the beats cannot be distinguished from each other so that no rhythm of any kind is audible in the time indicated. Therefore, it is not possible to make an aural distinction between the various kinds of times.

SUMMARY OF THE INVENTION

The invention aims to provide a device of the above-mentioned type, wherein the above objections are obviated in a simple but nonetheless effective manner.

For this purpose, the device according to the invention is characterised by means for varying the musical properties of the separate beats.

In this way, the beats of a time can be given differing accents so that the beats can be clearly distinguished from each other, whereby a rhythm can be recognized. Further, a clear distinction is possible between the various kinds of time. A beat can be indicated by a tone or a pause.

According to the invention, the reproducing period of each of the beats can be adjusted separately. Further, with the device according to the invention the volume of each of the beats can be adjusted at at least two regulable levels, the pitch of each of the beats also being separately adjustable.

In this way, many variations are possible to accentuate the various beats.

According to a preferred embodiment of the invention, said varying means are provided with N switch elements each having at least three switch settings, and a scanning element for the cyclic consecutive scanning of the N switch elements, wherein a tone is generated in a first channel during the scan period of each of the switch elements in the second switch setting of the switch element, while a tone is generated in a second channel in the third switch setting of the switch element and no tone is generated in the first switch setting of the switch element in either channel, both channels being common to the N switch elements. In this way, highly complicated rhythms can be made audible by means of the device according to the invention, such as for example a combination of three-four quarter and four-quarter time. Further, each beat can be changed as desired at any moment also during the reproduction without the necessity of following a certain sequence.

BRIEF DESCRIPTION OF THE DRAWINGS

The invention will now be explained by reference to the drawings in which an embodiment of the device according to the invention is shown.

DETAILED DESCRIPTION OF THE PREFERRED EMBODIMENT

Figure 2:
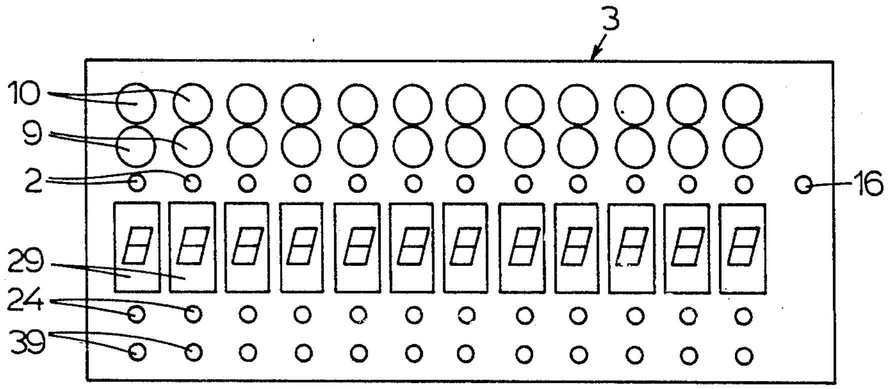
FIG. 2 is a view of a control panel for the device according to FIG. 1.
Figure 1:
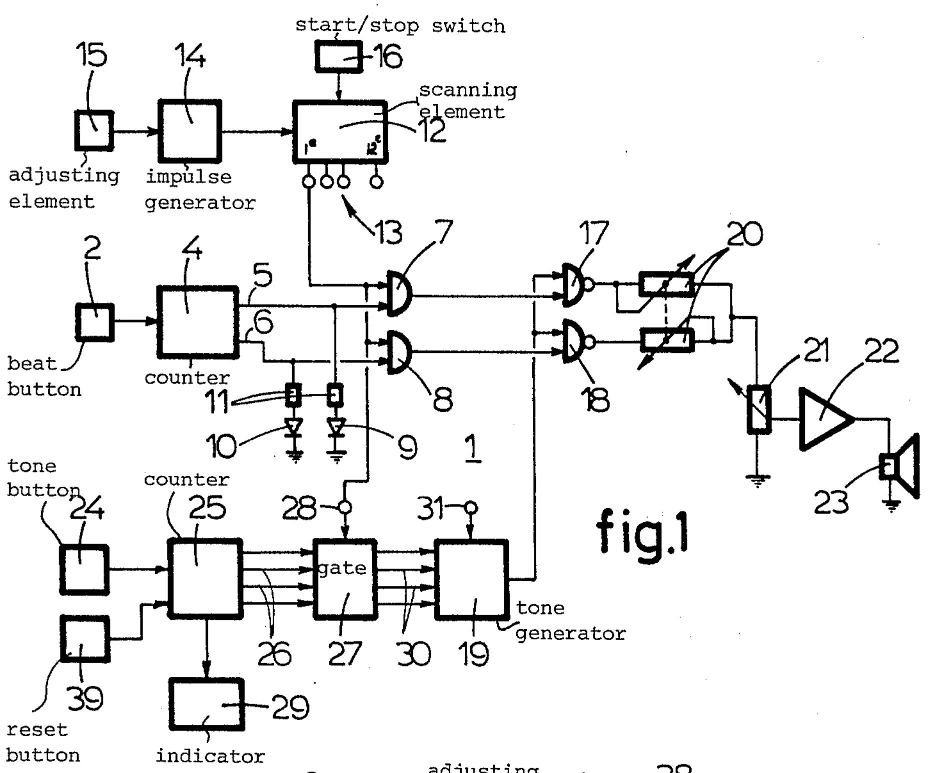
FIG. 1 is a block diagram of an embodiment of the device according to the invention.

FIG. 1 shows a block diagram of a device 1 for indicating the beats of a musical time. In the embodiment described, twelve beat buttons or keys 2 are present for operating the device 1, of which only the first beat button 2 is shown in FIG. 1. The device 1 can also, if required, be equipped with a different number of beat buttons 2, for example 24 or 48 beat buttons 2. The beat buttons 2 are incorporated in an operating or control panel 3 which is shown in FIG. 2.

Each beat button 2 is connected to an associated binary counter 4 with two outputs 5 and 6 each of which is connected to a first input of an AND gate circuit 7 or 8. The counter 4 runs cyclically through the logic states 00, 01, 10 under the control of the associated beat button 2 so that three switch settings are possible for each beat button 2. The selected switch setting for each of the beat buttons 2 is shown visually on the operating panel 3 with the aid of two light-emitting diodes 9, 10 which are mounted above the associated beat button 2 and which are connected to the counter outputs 5 or 6 through a resistance 11. The diode 9 may, for example, show red and the diode 10 green. Neither of the diodes 9, 10 lights up in switch setting 00.

For further processing the selected switch settings of the beat buttons 2 are scanned cyclically by a scanning element 12 with twelve outputs 13 which are connected to the second inputs of the consecutive AND gate circuits 7, 8. The scanning element 12 is controlled by a clock signal of an impulse generator 14, so that outputs 13 consecutively receive the logic value 1 during the period of the clock signal. The period during which each of the outputs 13 has the logic value 1 is hereinafter called the "scan period" while the period required for scanning all beat buttons 2 once only is called the "scan cycle". The scanning element 12 may, for example, be implemented as a closed-circuit 12-stage shift register in which a logic 1 is shifted by the clock signal. The frequency of the impulse generator 14 is adjustable by means of a adjusting element 15 by means of which the scan speed of the scanning element 12 can be adjusted. Further, a start/stop switch element 16 is provided by means of which the scanning element 12 can be switched on and off.

The outputs of the twelve AND gate circuits 7 are all connected to the first input of a NAND gate 17, while the outputs of the twelve AND gate circuits 8 are all connected to the first input of a NAND gate 18. The second inputs of the NAND gates 17, 18 are connected to a digital tone generator unit 19, which will be discussed below. AND gates may also be used instead of the NAND gates 17, 18, if desired.

The outputs of the NAND gates 17, 18 are connected via a balance regulator 20 to an adjustable voltage divider 21 which serves as volume control. The adjustable terminal of the voltage divider 21 is connected to the input of an amplifier 22 whose output is connected to a reproducing element 23 for example a load-speaker.

As FIG. 2 shows, a corresponding tone button or key 24 is located beneath each beat button 2, only the first tone button 24 being reproduced in the block diagram of FIG. 1. Each tone button 24 is coupled to an associated counter 25 with four outputs 26, which are coupled to the inputs of a gate circuit 27. A switch input 28 of the gate circuit 27 is connected to the output associated with the corresponding beat button 2 of the scanning element 12, so that the switch settings of the corresponding tone buttons 24 are scanned simultaneously with the scanning of the switch settings of beat buttons 2.

The tone counter 25 counts from zero to nine under the control of the associated tone button 24 so that ten switch settings can be selected with the tone button 24. The selected switch settings of the tone buttons 24 can be read on corresponding digital indicator elements 29.

The four outputs of the gate circuits 27 are all connected to four selector inputs 30 on the tone generator unit 19. Depending on the logic input combination on the selector inputs 30, a digital output signal with ten different frequencies can be supplied by the tone generator unit 19, these frequencies corresponding to the various tones in the octave. The frequency range of the octave can, for example, be varied by changing the impulse frequency of a clock signal at the clock input 31 of the tone generator unit 19.

It follows from the above that as the scanning element 12 scans the beat buttons 2 and the tone buttons 24, depending on the switch setting 01 or 10 of the related beat button 2, the digital output signal of the tone generator 19 will appear at the output of the NAND gate 17 or 18 for the period of the clock signal of the impulse generator 14. The frequency of this output signal is determined by the switch setting of the corresponding tone button 24. This digital output signal is supplied to the amplifier 22, within which a filter unit is included and whose amplified output signal is made audible by the reproducing element 23.

The beat buttons 2 and the tone buttons 24 are of the touch control type so that the device 1 can be simply and easily operated. The beat and tone buttons 2, 24 may also, however, be of a different type, for example, mechanical switches.

The digital tone generator unit 19 may alternatively be replaced by an analog tone generator unit. In that case, the NAND gates 17, 18 take the form of so-called bilateral switch elements each of which is equipped with a switch input, a signal input and a signal output. The switch inputs of these bilateral switch elements are then linked to the outputs of the AND gate circuits 7, 8, while the signal inputs are linked with the output of the tone generator unit and the signal outputs to the balance regulator.

The operation of the device 1 as described will now be elucidated, with some of the many potential uses being discussed.

An initial state is assumed in which all beat and tone buttons 2, 24 are in the first switch state. If, for example, a four-quarter time is to be indicated, the twelve beat buttons 2 may be sub-divided into four groups of three beat buttons, wherein the first, fourth, seventh and tenth beat buttons 2 are each operated once only. The corresponding diodes 9 will light up and the beats which are separated from each other by an interval determined by the beat buttons 2 not operated become audible. The tempo at which the beats are reproduced can be regulated by adjusting the frequency of the impulse generator 14 by means of the adjusting element 15. At this stage no distinction can yet be made between the beats. However, one or more of the beats can now be accentuated by, for example, operating the second beat button 2 so that one of the beats will sound twice as long as the other beats.

Another possibility for accentuation is to operate the first beat button 2 a second time, whereby the corresponding diode 10 will light up and the output signal of the tone generator unit 19 will appear at the output of the NAND gate 18 instead of at the output of the NAND gate 17. Depending on the balance set by means of the balance regulator 20, the beat concerned will now sound louder or softer than the other beats. The difference in volume can be adjusted with the balance regulator 20 as desired, while the total volume can be varied by means of voltage divider 21.

A third possibility for accentuating the beats is to vary the pitch of each of the beats by means of the tone buttons 24, in which case according to the embodiment described ten different tones can be selected for each beat button 2. The number of different tones can, of course, be increased or decreased by adapting the device 1 described appropriately.

Further, the three possibilities described for accentuating the separate beats can, of course, be combined so that a large number of variations is possible. In this way, the musician finds it very simple to recognise and/or imitate difficult kinds of times or rhythms.

The operation just described of the beat buttons 2 for introducing a desired rhythm can be undertaken with the scanning element 12 switched off, whereafter the rhythm introduced or programmed is reproduced by switching on the scanning element 12 by means of the start/stop switch element 16. However, a rhythm can also be introduced with the scanning element 12 switched on and a rhythm introduced can be altered during reproduction.

The device 1 described can also, for example, be used to reproduce a four-quarter time and three-quarter time simultaneously. For this purpose, the first, fourth, seventh and tenth beat buttons 2 are operated for the four-quarter time and then the fifth and ninth beat buttons 2 for he three-quarter time. In this case, certain beats should be accentuated in the way described in order to make the desired rhythm recognizable. To prevent the beats indicated by adjacent beat buttons 2 from merging with each other, the fourth and ninth beat buttons 2 may, for example, be given different accentuations from the fifth and tenth beat buttons 2, so that the beats can be distinguished.

The merging of the beats at the simultaneous reproduction of various times can also be avoided by equipping the device 1 with 24 beat buttons for example.

Figure 3:
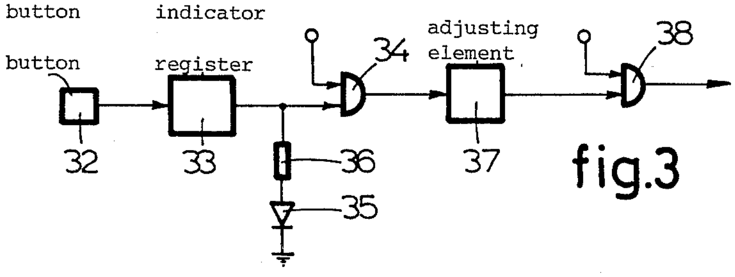
FIG. 3 is a block diagram of a circuit which can be added to the device according to FIG. 1.

The device 1 described, may further, be equipped with a reducing unit which is shown schematically in FIG. 3. An additional button 32 must then be mounted in the operating panel 3 for each beat button 2 (not shown in FIG. 2), which can also be of the touch control type or the like. The button 32 is connected to a register 33, in which a logic 1 or logic 0 is entered alternately by operating the button 32. The output of the register 33 is connected to a first input of an AND gate 34, while a light-emitting diode 35 is also connected by a resistance 36 to the output of the regiser 33 for signalling the switch settings of the button 32. A second input of the AND gate 34 should be connected to the output of the scanning element 12 associated with the corresponding beat button 2, so that the switch setting of the button 32 is scanned simultaneously with the switch setting of the beat button 2.

The outputs of the twelve AND gates 34 are connected to an adjusting element 37, an output of which, which normally has the value 1 but acquires the logic value 0 on receipt of a signal from the output of one of the AND gates 34 during a period adjustable by the adjusting element 37, is connected to a first input of an AND gate 38. A second input of the AND gate 38 must be coupled with the output of the tone generator unit 19, while the output should be connected to the second inputs of the AND gates 17, 18.

In this way, the period during which the tone indicating the beat is audible, can be set for each beat button 2 within the period of the oscillator 14. In this manner, these beats can be prevented from merging when two successive beat buttons 2 are set for two separate beats.

The device 1 can be further provided with a number of memories (not shown in the drawings), wherein data concerning the switch settings of the beat buttons 2, the tone buttons 24 and the buttons 32 may be stored in each memory. By reading out these memories in consecutive cycles, with the data concerning the switch settings being each time conveyed to the counters 4, 25 and the register 33, highly complicated rhythms and the like can be made audible.

With this embodiment comprising a memory the merging referred to above of the various beats at the simultaneously reproduction of, for example, a four-quarter time and three-quarter time, can quite simply be avoided. Each beat of the four-quarter time may, for example, be sub-divided into twelve parts by means of the twelve beat buttons 2. If the first beat is accentuated in the desired manner, the data concerning the switch settings of the various buttons can be stored in a first memory after which the second beat is accentuated and the data concerning the switch settings of the various buttons stored in a second memory, and so on. The beats of the three-quarter time can then easily be inserted at the correct points between the beats of the four-quarter time without these beats merging into each other. After the beats have been introduced, the four memories are then read out in a successive cycle, so that the desired rhythm is made audible.

To simplify the operation of the device 1, a reset button 39 can be fitted for each tone button 24, by means of which the associated counter 25 can be reset immediately to zero. The reset button 39 can similarly be of the touch control type or the like.

As an alternative to the tone selection facility described, the twelve tone buttons 24 can each correspond to a specific tone, with the tone selected for each of the beat buttons 2 being stored in a memory which is read out simultaneously with the scanning of the beat buttons 2.

It should further be noted that in order to reproduce a kind of time where the beat buttons 2 cannot be distributed evenly over the beats, e.g. in the case of a seven-quarter time and a device with twenty four beat buttons 2, the scanning element 12 can be adjusted with the aid of a switching element (not shown) to a diferent scan cycle, wherein such a number of beat buttons 2 is scanned that an equal distribution is possible.

The invention is not limited to the embodiments described above which can be varied in different ways within the scope of the invention.

I claim:

1. A device for the acoustic indication of a musical time, said musical time comprising a plurality of musical beats with musical properties comprising volume, pitch, tempo and reproduction period, said device comprising means for varying the musical properties of each beat separately, wherein said varying means comprises N switch elements each connected to an associated binary counter with two outputs, one output of which is connected to a first input of a first gate circuit and the other output of which is connected to a first input of a second gate circuit, a second input of each of the first and second gate circuits being connected to one of N outputs of a scanning element for the cyclic consecutive scanning of the N first and second gate circuits, wherein the N first gate circuits are connected by their outputs to a first input of a first switch circuit and the N second gate circuits are connected by their outputs to a first input of a second switch circuit, wherein a second input of the first and second switch circuits is connected to the output of a tone generator unit, the outputs of said first and second switch circuits being connected to a sound reproduction system.

2. A device according to claim 1, wherein said sound reproduction system comprises a balance regulator, the outputs of said first and second switch circuits being connected to said balance regulator, said sound reproduction system further comprising an adjustable voltage divider and an amplifier which controls an acoustic reproduction element.

3. A device according to claim 2, wherein the tone generator unit can generate different tones and comprises tone selection inputs connected to a selector unit for selecting one of the different tones for each of the N switch elements, said selector unit including a tone switch element for each of said N switch elements, each of said tone switch elements being connected to an associated tone counter with a number of counter states corresponding to the number of different tones of the tone generator unit, wherein the outputs of each counter are connected to the inputs of a corresponding gate circuit which comprises a switch input connected to a corresponding output of the N outputs of the scanning element, and wherein the N gate circuits each are connected by their outputs to the tone selection inputs of the tone generator unit.

4. A device according to claim 3 wherein each of said tone counters is coupled to an associated digital indicator element for indicating the selected tone.

5. A device according to claim 1, wherein each of the two outputs of each binary counter controls an associated light-emitting diode.

6. A device according to claim 3, wherein a control means is provided for each of the N switch elements, an output of said control means being connected to an input of a third gate circuit, a second input of which is connected to the corresponding output of the N outputs of the scanning element, wherein the output of said control means is connected to an adjusting element for adjusting the time duration of the tone signal at the output of the tone generator unit in each scan period, said control means including means for switching said control means on and off.

7. A device for the acoustic indication of musical time comprising:

a scanning means;

N switch elements which are sequentially enabled by said scanning device, and having a pre-selecting means for providing a first, second and third setting for said switch elements a tone generator;

a first and second switch circuit with a first volume and a second volume respectively, said switch circuits being connected to said tone generator;

wherein the first switch circuit is enabled by any one of said N switch elements when said switch element is preset at the second setting, and wherein the second switch circuit is enabled by any one of said N switch elements when said switch element is preset at the third setting;

an acoustic reproduction element connected to said switch circuits;

wherein as each switch element is sequentially enabled by the scanning means, no sound is produced if the switch element is preset at the first setting, a sound of a first volume is produced when the switch element is preset for the second setting and a sound of second volume is produced when the switch element is preset to the third setting, by the acoustic reproduction element.

8. A device according to claim 7 wherein said preselecting means comprise:

a first binary counter with a first output and a second output;

a first gate circuit connected to said first output and the scanning means;

a second gate circuit connected to said second output and the scanning means; and a beat button which is provided to preset said first counter to the first setting, a second setting which enables the first output and a third setting which enables the second output;

wherein said first and second gate circuit enable said first and second switch circuit respectively.

9. A device according to claim 8 wherein the outputs of said first binary counter are connected to light-emitting diodes.

10. A device according to claim 7 wherein the tone generator has an adjustable frequency and wherein each of the N switch elements also comprises:

a tone counter;

a tone button connected to the tone counter to set the tone counter to a tone setting; and a gating means coupled to said tone counter which is enabled by the scanning means to produce a digital output signal, said signal being supplied to the tone-generator to adjust its frequency.

11. A device according to claim 10 also comprising a digital indicator to indicate the setting of said second counter.

* * * * *

UNITED STATES PATENT AND TRADEMARK OFFICE
CERTIFICATE OF CORRECTION

PATENT NO. : 4,351,215

DATED : September 28, 1982

INVENTOR(S) : Hendrik D. van der Bruggen

It is certified that error appears in the above—identified patent and that said Letters Patent is hereby corrected as shown below:

Column 2, line 60, "load-speaker" should be --loud-speaker--;

Column 4, line 36, "he" should be --the--; and

Column 5, line 8, "oscillator" should be -- impulse generator--.

Signed and Sealed this

*Fifteenth* Day of *February 1983*

[SEAL]

*Attest:*

GERALD J. MOSSINGHOFF

*Attesting Officer* *Commissioner of Patents and Trademarks*